United States Patent
Morton

[15] 3,667,446
[45] June 6, 1972

[54] CHARCOAL GRILL

[72] Inventor: Paul S. Morton, 82 Mandalay Drive, Oshtemo, Mich. 49001

[22] Filed: Aug. 12, 1970

[21] Appl. No.: 63,166

[52] U.S. Cl. .......................................... 126/9 R, 126/25 C
[51] Int. Cl. ...................... A47j 37/00, F24b 3/00, F24c 1/16
[58] Field of Search ................ 126/9 R, 25, 25 A, 25 B, 25 C, 126/29

[56] References Cited

UNITED STATES PATENTS

| | | | |
|---|---|---|---|
| 1,438,345 | 12/1922 | Tait et al. | 126/9 |
| 2,221,098 | 11/1940 | Langsam | 126/25 |
| 2,477,529 | 7/1949 | Sprinkle et al. | 126/9 |
| 2,985,164 | 5/1961 | Imoto | 126/9 X |
| 3,068,852 | 12/1962 | Purtzer | 126/25 |
| 3,384,066 | 5/1968 | Tufts | 126/9 |

FOREIGN PATENTS OR APPLICATIONS

| | | | |
|---|---|---|---|
| 674,303 | 4/1939 | Germany | 126/9 |

Primary Examiner—Charles J. Myhre
Attorney—Woodhams, Blanchard and Flynn

[57] ABSTRACT

A portable and collapsible charcoal burning grill having an open top base and a removable cover therefor. The grill construction also comprises an upstanding collapsible support member adapted to be mounted on the open top base when in a position of use around the perimeter of the open top, the support member being also adapted to collapse and be received in the open top base for storage therein. A charcoal holding grate is provided and is adapted to be removably mounted on the support member when in a position of use and further adapted to be receivable in the open top base along with the collapsed support member for storage therein. A food holding grill is also provided and adapted to be removably mounted on the support member when in a position of use and spaced upwardly from the charcoal holding grate. The food holding grill is also adapted to be receivable in the open top base along with the collapsed support member and the charcoal holding grate for storage therein. The base has a sufficient depth to permit the cover to cover the open top to thereby permit a storage of the collapsed support member, the charcoal holding grate means and the food holding grill means within the base. If desired, a charcoal collecting member may be provided and adapted to be removably mounted in the open top base below the charcoal holding grate when in the position of use.

14 Claims, 8 Drawing Figures

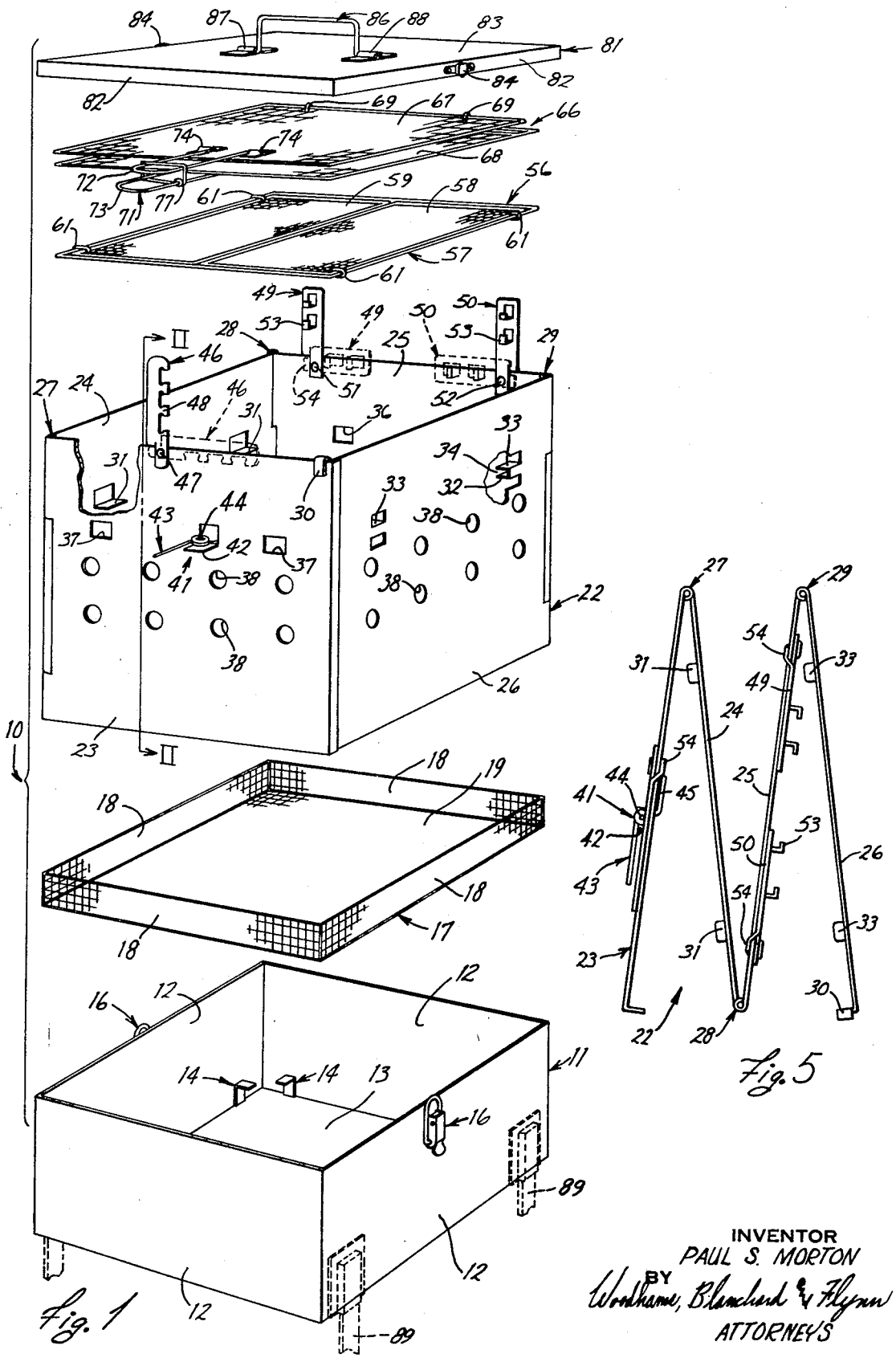

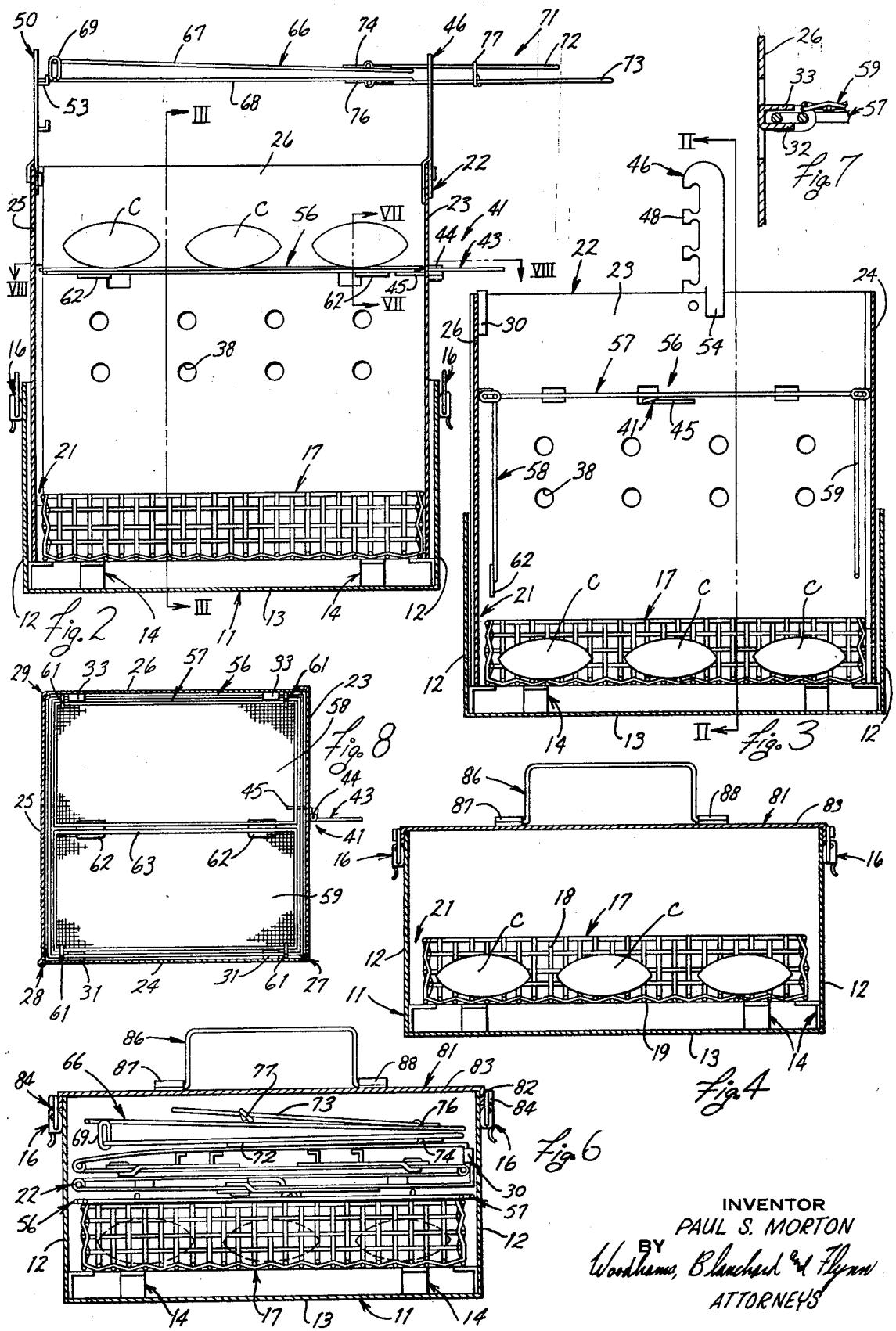

3,667,446

CHARCOAL GRILL

FIELD OF THE INVENTION

This invention relates to a charcoal burning grill and, more particularly, relates to a portable and collapsible charcoal burning grill including means for extinguishment of the heat source.

BACKGROUND OF THE INVENTION

Portable charcoal burning grills have been known for many years and have proven to be quite successful for use in outdoor cooking around the home and on camping sites. Portable grills which are also collapsible for transit purposes are also known. However, a need has developed in a collapsible type charcoal burning grill for means effecting the extinguishment of the heat source without necessitating a dumping of the coals onto the ground or permitting same to burn themselves out while in the fire pan of the grill. Numerous devices have been devised thus far for extinguishing the heat source after a cooking operation has been completed. These devices, as far as I am aware, have all been utilized in association with a noncollapsible type grill construction or have involved extra auxiliary equipment separate from the grilling apparatus which makes same inconvenient to use and store in and around the home and inconvenient to carry on camping trips.

Whether for home or camping use, it has long been desirable to be able to pack the cooking apparatus neatly and compactly away. However, with the presently known grill constructions, it is not possible to easily dismantle the outdoor cooking apparatus without using tools. Further, and particularly under camping conditions, it is desirable to be able to dismantle the outdoor cooking apparatus and store same without being concerned about the cooking apparatus being tipped over during transit and spilling residual ashes over the other camping equipment. While it is recognized that a normally careful user would dump the ashes from the outdoor cooking apparatus prior to its being packed for transit purposes, if the device is complicated to assemble and disassemble, the camper may choose not to dismantle it after every use and, as a result, the ashes which have become caked to the fire pan could become dislodged and spilled onto other camping equipment.

Accordingly, the objects of the present invention include:

1. To provide a portable and collapsible charcoal burning grill which includes means for extinguishment of the heat source;

2. To provide a portable and collapsible charcoal burning grill, as aforesaid, wherein the components of the grill are all adapted to be received within the base and covered by a lid capable of being fixedly secured to the base to permit the charcoal burning grill to be transported from one location to another;

3. To provide a portable and collapsible charcoal burning grill which, in a position of use, comprises a charcoal holding grate for holding charcoal during a cooking operation and when the cooking operation is completed, the charcoal holding grate may be moved to a position to cause the charcoal to be dumped into a charcoal collecting member in the base and thereafter the food holding grill, the charcoal holding grate and the means for supporting same on the base are removed from the base to permit the lid to be placed over the open top of the base to cause a suffocation of the burning charcoal to effect an extinguishment thereof;

4. To provide a portable and collapsible charcoal burning grill which is inexpensive to manufacture and simple to assemble and disassemble.

Other objects and purposes of this invention will be apparent to persons acquainted with charcoal burning grills of this general type upon reading the following specification and inspecting the accompanying drawings, in which:

FIG. 1 is an exploded perspective view of a portable and collapsible charcoal burning grill embodying the invention;

FIG. 2 is a sectional view taken along the line II—II of FIGS. 1 and 3;

FIG. 3 is a sectional view taken along the line III—III of FIG. 2;

FIG. 4 is a central sectional view of the apparatus with the charcoal holding grate, the food holding grill and the support therefor having been removed and the lid installed for purposes of extinguishing the charcoals;

FIG. 5 is a top view of the collapsible support;

FIG. 6 is a central sectional view similar to FIG. 4 except that each of the charcoal holding grate, food holding grill and the support member have been collapsed and positioned in the base to permit a transporting of the grill from one location to another;

FIG. 7 is a sectional view taken along the line VII—VII of FIG. 2; and

FIG. 8 is a sectional view taken along the line VIII—VIII of FIG. 2.

Certain terminology will be used in the following description for convenience in reference only and will not be limiting. The words "up," "down," "right" and "left" will designate directions in the drawings to which reference is made. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing in a portable and collapsible charcoal burning grill an open top base having a removable lid therefor. An upstanding support member is adapted to be mounted on the open top base when in a position of use around the perimeter of the open top. The support member includes means rendering same collapsible and receivable in the open top base for storage therein. A charcoal holding grate is adapted to be removably mounted on the support member when in a position of use and further adapted to be receivable in the open top base along with the collapsed support member for storage therein. A food holding grill is adapted to be removably mounted on the support member when in a position of use and spaced upwardly from the charcoal holding grate. The food holding grill is also adapted to be receivable in the open top base along with the collapsed support member and the charcoal holding grate for storage therein. The base has a sufficient depth to permit the lid to cover the open top to thereby permit a storage of the support member, the charcoal holding grate and the food holding grill within the base. The support member, charcoal holding grate and the food holding grill may be removed from the base member and the lid placed over the base to suffocate the charcoal in the base.

DETAILED DESCRIPTION

A portable and collapsible charcoal burning grill 10 comprises an open top base 11 having a plurality of upstanding walls 12, here four walls, and a bottom wall 13. A plurality of L-shaped tabs 14 are fixedly secured to the upstanding walls 12 so that one leg of each of the tabs 14 is spaced upwardly from the bottom wall 13 and extends horizontally inwardly from the walls 12. The base member 11 also has a pair of conventional fastening devices 16 secured to a pair of opposite upstanding walls 12 as illustrated in FIG. 1.

An open top charcoal collecting receptacle 17 comprises a plurality of upstanding walls 18 and a bottom wall 19. The peripheral dimension of the upstanding walls 18 is preferably slightly less than the size of the opening into the open top base member 11 so that the charcoal collecting receptacle may be received in the open top base member 11 and supported on the L-shaped tabs 14 as illustrated in FIGS. 2 through 4 and 6. A gap 21 (FIG. 4) is provided between the upstanding walls 18 of the charcoal collecting receptacle 17 and the upstanding walls 12 of the open top base member 11. In this particular embodiment, the charcoal collecting receptacle 17 is of a wire mesh construction. However, it is to be recognized that the charcoal collecting receptacle could also be made of sheet metal wherein the bottom wall 19 thereof would have perforations therein to permit the ashes from the consumed charcoal to fall through the bottom wall onto the bottom wall 13 of the base member 11. It has been found, however, that the utilization of a wire mesh construction for the charcoal collecting receptacle 17 is more effective in permitting the ashes to fall through the openings provided therein onto the bottom wall 13 of the open top base member 11.

A multipaneled support member 22 comprises a plurality of upstanding walls hingedly interconnected. In this particular embodiment, the support member 22 comprises four upstanding walls 23, 24, 25 and 26 to define a rectangular shaped shell. The upstanding wall 23 is hingedly connected to the upstanding wall 24 by a hinged joint 27. The upstanding wall 24 is hingedly connected to the upstanding wall 25 by a hinged joint 28. The upstanding wall 25 is hingedly connected to the upstanding wall 26 by a hinged joint 29. A U-shaped tab 30 is fixedly secured to the free edge of the upstanding wall 26 and is adapted to overlap the free edge of the upstanding wall 23 to thereby define a closed-sided shelf. The peripheral dimension of the shell is less than the perimeter of the opening into the base member 11 but greater than the perimeter of the charcoal collecting receptacle 17.

A pair of horizontally spaced and horizontally aligned tabs 31 are punched out of the wall 24 as illustrated in FIG. 1. A pair of tabs 32 (FIGS. 1 and 7) are punched out of the wall 26 and are horizontally aligned with the tabs 31 in the wall 24. If desired, an additional pair of tabs 33 may be punched out of the wall 26, which tabs 33 are spaced vertically upwardly from the tabs 32 to define a gap 34 therebetween. A pair of openings 36, only one of which is shown in FIG. 1, is punched into the wall 25 and horizontally aligned with the pair of tabs 32 and 33 so that when the wall 26 is pivoted about the hinged joint 29 to a position approximately parallel with the wall 25 (FIG. 5), the tabs 32 and 33 will project through the openings 36. A pair of openings 37 is punched into the wall 23 and horizontally aligned with the tabs 31 in the wall 24. Thus, when the wall 23 is pivoted about the hinged joint 27 to a position approximately parallel with the wall 24 (FIG. 5), the tabs 31 will project through the openings 37.

Each of the upstanding walls 23, 24, 25 and 26 is provided with a plurality of openings 38 positioned below the horizontal plane defined by the tabs 31 and 32 to permit the passage of air therethrough to facilitate a complete and efficient burning of the charcoal.

A trigger mechanism 41 (FIGS. 1, 2, 5 and 8) comprises a tab 42 punched out of the wall 23 and has a latch member 43 pivotally secured to the tab 42 by any convenient means, such as a rivet 44. The latch member 43 has a trip finger 45 which is located to one side of a vertical plane through the center of the upstanding wall 23 as illustrated in FIG. 8.

A grill support bracket 46 is pivotally secured to the upstanding wall 23 adjacent the upper edge thereof by any convenient means such as a rivet 47. The grill support bracket 46 is pivotal between a first position illustrated in solid lines and a second position illustrated in broken lines. A plurality of vertically spaced hooks 48 are provided on the grill support bracket 46. A pair of grill support brackets 49 and 50 are pivotally secured to the upper edge of the wall 25 by any convenient means such as rivets 51 and 52, respectively. The grill support brackets 49 and 50 are pivotal between a first position illustrated in solid lines and a second position illustrated in broken lines. The grill support brackets 49 and 50 have hooks 53 thereon for holding a food holding grill member discussed in detail hereinbelow. Each of the grill support brackets 46, 49 and 50 includes a stop 54 which comprises a tab punched out of the brackets and overlaps the upper edge of the walls for limiting the pivotal movement from the broken line position to the solid line position to approximately a 90° angle. That is, the stops 54 prevent a pivotal movement of the grill support brackets 46, 49 and 50 beyond a 90° angle.

A charcoal holding grate member 56 comprises an annular frame 57 to which is hingedly connected a pair of panels 58 and 59. The perimeter of the frame 57 is slightly less than the perimeter of the assembled support member 22 to permit a support thereof on the tabs 31 and 32. The panels 58 and 59 are preferably made of a wire mesh construction and each occupy about one half of the area defined by the annular frame 57 and the support member 22 when the unit is completely assembled. The panels 58 and 59 are each hingedly connected to the frame 57 by a pair of wire rings 61 preferably weldably secured to the annular frame 57. At least one, but preferably two flanges 62 (FIGS. 2, 3 and 8) are fixedly secured to the panel 58 and extend outwardly from the panel 58 beneath the panel 59 when in the position illustrated in FIGS. 1, 2 and 8.

The annular frame 57 is adapted to slide into the gap 34 between the tabs 32 and 33 so that the tabs 33 will be positioned above the annular frame 57. The finger 45 of the latch 43 is positionable beneath the panel 58 as illustrated in FIGS. 2 and 8 to prevent a pivotal movement of the panel 58 toward the position illustrated in FIG. 3. The central edge 63 (FIG. 8) of the panel 59 will be supported on the flange 62 so that the panel 59 will be prevented from pivoting to the position illustrated in FIG. 3 until the finger 45 is moved from the supporting position shown in FIGS. 2 and 8 to the charcoal dumping position illustrated in FIG. 3.

A food holding grill 66 comprises a pair of panels 67 and 68 hingedly interconnected by a pair of rings 69 weldable secured to one of the panels, such as the panel 68. In this particular embodiment, the panels 67 and 68 may be of a wire mesh construction or any other conventional grid construction utilizing wire rods. A handle 71 comprises a pair of U-shaped members 72 and 73 each being pivotally connected to a respective panel 67 and 68 by a pair of brackets 74 and 76, respectively. The U-shaped member 72 is preferably shorter than the U-shaped member 73. An annular ring 77 is secured to the U-shaped member 73 and is adapted to move longitudinally thereon and be looped over the U-shaped member 72 to lock the panels 67 and 68 in the position illustrated in FIGS. 1 and 2. Since the U-shaped member 72 is shorter than the U-shaped member 73, a movement of the annular ring 77 rightwardly (FIG. 2) will free the U-shaped members 72 and 73 from each other to permit an opening of the panels 67 and 68 to permit the removal of the cooked food or the insertion of uncooked food therebetween. This will also permit a pivotal movement of each of the U-shaped members 72 and 73 from the position illustrated in FIG. 2 to a position 180° therefrom such as is illustrated in FIG. 6.

A lid or cover 81 is adapted to fit over the open top base 11 to sealingly close same and comprises a plurality of upstanding walls 82 and a top wall 83 secured to the upper edges of each of the upstanding walls 82. A fastening device 84 is secured to a pair of opposite upstanding walls 82 and are cooperable with the fastening devices 16 on the upstanding walls 12 of the base member 11 to hold the lid 81 on the base member 11. A handle 86 is secured to a pair of brackets 87 and 88 which in turn are fixedly secured to the top wall 83 by any convenient means.

OPERATION

Although the operation and assembly of the device described above will be understood from the foregoing description by skilled persons, a summary of such description is now given for convenience.

As illustrated in FIG. 6, each of the charcoal collecting receptacle 17, multipaneled support member 22, charcoal holding grate 56 and the food holding grill 66 may be collapsed to a size permitting an insertion into the open top base and covered by the lid 81 for storage therein. However, when it is desired to use the apparatus for purposes of cooking, the lid 81 is removed by first unhooking the fastening devices 16 on the base member 11 from the cooperating fastening devices 84 mounted on the lid 81. Each of the multipaneled support member 22, charcoal holding grate member 56 and the food holding grill member 66 are removed from the base member 11. The charcoal collecting receptacle 17 need not be removed since same is usually the bottommost component in the base member 11 and rests on the plurality of L-shaped tabs 14.

The multipaneled support member 22 is assembled by pivoting each of the walls 23–26 about the respective hinged joints 27, 28 and 29 to the position illustrated in FIG. 1 to define a closed shell. The U-shaped tab 30 serves to lock the panel 23 to the panel 26. The multipaneled support member 22 is then placed into the base member 11 and the lower edge thereof is inserted into the gap 21 between the charcoal collecting receptacle 17 and the upstanding walls 12 of the base member 11. The plurality of air openings 38 in the upstanding walls 23 through 26 of the multipaneled support member 22 are located above the upper edge of the upstanding walls 12 of the base member 11 to permit a passage of air therethrough during a cooking operation.

One edge of the charcoal holding grate member 56 is then inserted into the gap 34 between the vertically spaced tabs 32 and 33 and the opposite edge is then lowered onto the opposite tabs 31 so that the charcoal holding grate member 56 is essentially horizontally supported in the support member 22. If the tabs 33 are omitted, the charcoal holding grate member 56 need only be positioned on the tabs 31 and 32 without necessitating an insertion of one edge of the charcoal holding grate member into the gap 34. When the finger 45 of the latch 43 of the trigger mechanism 41 is moved to the position illustrated in FIGS. 2 and 8, the panel 58 is supported in a horizontal position and is prevented from moving to the dropped position illustrated in FIG. 3. The flange or flanges 62 support the panel 59 and maintains same in the same plane as the panel 58.

The grill support brackets 46, 49 and 50 are each pivoted from the broken line positions illustrated in FIG. 1 to the solid line position. The food holding grill 66 is then assembled by pivoting each of the U-shaped members 72 and 73 from the position illustrated in FIG. 6 to the position illustrated in FIGS. 1 and 2 wherein the U-shaped members 72 and 73 extend outwardly from each of the panels 67 and 68. The edge of the food holding grill 66 remote from the handle 71 is then placed onto the support hooks 53 on the grill support brackets 49 and 50 as illustrated in FIG. 2. The handle 71 is then placed onto a corresponding hook 48 on the grill support bracket 46 to position the food holding grill 66 above the charcoal holding grate 56.

Charcoal C may then be placed onto the charcoal holding grate and ignited in the usual manner, with cooking to proceed in the usual manner. At the completion of the cooking operation, the trigger mechanism 41 can be actuated by moving the latch 43 from the position illustrated in FIGS. 2 and 8 to a position wherein the finger 45 of the latch 43 is essentially parallel with the upstanding wall 23 so that the panels 58 and 59 will be permitted to pivot downwardly to the position illustrated in FIG. 3 to dump the charcoal C into the charcoal collecting receptacle 17. The support member 22 is then removed from the base and the lid 81 is then placed onto the open top base 11 to sealingly close same as illustrated in FIG. 4. As a result, the charcoal is thus suffocated and extinguished. When the entire unit has cooled, the various components may be disassembled and replaced into the container as illustrated in FIG. 6, even with the extinguished charcoal still in the receptacle 17, for purposes of transporting the cooking apparatus from one location to another.

When a new cooking operation is desired, the extinguished charcoal in the receptacle 17 may be reused by placing same on the grate 56 and igniting.

A plurality of legs or supports 89, either folding or telescoping, may be provided, if desired, and attached to the base member 11 in any convenient manner as illustrated by broken lines in FIG. 1.

Although a particular preferred embodiment of the invention has been disclosed in detail for illustrative purposes, it will be recognized that variations or modifications of the disclosed apparatus, including the rearrangement of parts, lie within the scope of the present invention.

I claim:
1. A portable and collapsible charcoal burning grill comprising:
   means defining an open top receptacle and a removable cover therefor;
   upstanding support means adapted to be mounted on said receptacle means when in a position of use and surrounding said open top, said support means including means rendering same collapsible and receivable in said receptacle means for storage therein;
   charcoal holding grate means mounted on said support means, said charcoal holding grate means being further adapted to be receivable in said receptacle means along with said collapsed support means for storage therein;
   charcoal collecting means adapted to be removably mounted in said receptacle means below said charcoal holding grate means; and
   food holding grill means adapted to be removably mounted on said support means when in a position of use and spaced upwardly from said charcoal holding grate means, said food holding grill means being further adapted to be receivable in said receptacle means along with said collapsed support means and said charcoal holding grate means for storage therein, said receptacle means having a sufficient depth to permit said cover means to cover said open top and to thereby permit a storage of said support means, said charcoal holding grate means and said food holding grill means therewithin as well as to effect extinguishment of the heat source when said support means, said charcoal holding grate means and said food holding grill means are not present therewithin.

2. A portable and collapsible charcoal burning grill according to claim 1, wherein said charcoal holding grate means includes means adapted to permit a dumping of charcoal from said charcoal holding grate means into said charcoal collecting means.

3. A portable and collapsible charcoal burning grill according to claim 1, wherein said support means includes manually operable means adapted to effect a dumping of said charcoal from said charcoal holding grate means into said charcoal collecting means.

4. A portable and collapsible charcoal burning grill according to claim 1, wherein said charcoal holding grate means are hingedly connected to said support means and movable between a position of supporting said charcoal thereon and a position for dumping said charcoal into said charcoal collecting means; and
   wherein said support means includes manually operable means adapted to hold said pair of wire mesh grates in said position of supporting charcoal thereon when in a first position and permitting a movement of said pair of wire mesh grates to said dumping position when in a second position.

5. A portable and collapsible charcoal burning grill according to claim 1, wherein said charcoal collecting means comprises a wire mesh container for collecting charcoal therein.

6. A portable and collapsible charcoal burning grill according to claim 1, wherein said cover means is adapted to effectively seal said open top of said receptacle means when said support means, said charcoal holding grate means and said food holding grill means are separated from said receptacle means to thereby extinguish by suffocation charcoal deposited in said receptacle means.

7. A portable and collapsible charcoal burning grill according to claim 1, including means defining a handle adapted to permit a carrying of said collapsed grill construction.

8. A portable and collapsible charcoal burning grill according to claim 1, wherein said support means comprises a plurality of thin-walled panels each hingably connected to at least one other panel and adapted to be assembled into a closed-sided upstanding shell and further adapted to be collapsed to a position wherein said plurality of panels are parallel to each other.

9. A portable and collapsible charcoal burning grill according to claim 9, wherein one of said panels has openings therethrough below said charcoal holding grate means to facilitate the flow of air up through said charcoal holding grate means when in said position of use to increase the burning efficiency of the charcoal.

10. A portable and collapsible charcoal burning grill according to claim 8, wherein each of said panels has openings therethrough below said charcoal holding grate means to facilitate the flow of air up through said charcoal holding grate means when in said position of use to increase the burning efficiency of the charcoal.

11. A portable and collapsible charcoal burning grill according to claim 8, wherein said support means comprises four equal sized panels, a pair of opposite panels including bracket means for removably supporting said food holding grill means and means for removably supporting said charcoal holding grate means below said food holding grill means.

12. A portable and collapsible charcoal burning grill according to claim 11, wherein said bracket means are pivotally secured to said support means, said bracket means being pivotable to a position to facilitate a storage of said support means in said receptacle means.

13. A portable and collapsible charcoal burning grill according to claim 1, wherein said food holding grill means includes defining a grid and a handle, said handle including means adapted to permit a movement thereof relative to said grid to facilitate a storage of said food holding grill means in said receptacle means.

14. A portable and collapsible charcoal burning grill according to claim 1, including means for securing said cover means to said receptacle means.

* * * * *